Sept. 2, 1969 K. E. BENDIXEN 3,464,630
PRESSURE ATOMIZING OIL BURNER
Filed Feb. 5, 1968 2 Sheets-Sheet 1

INVENTOR
KNUD E. BENDIXEN

BY *Stevens, Davis, Miller & Mosher*

ATTORNEYS

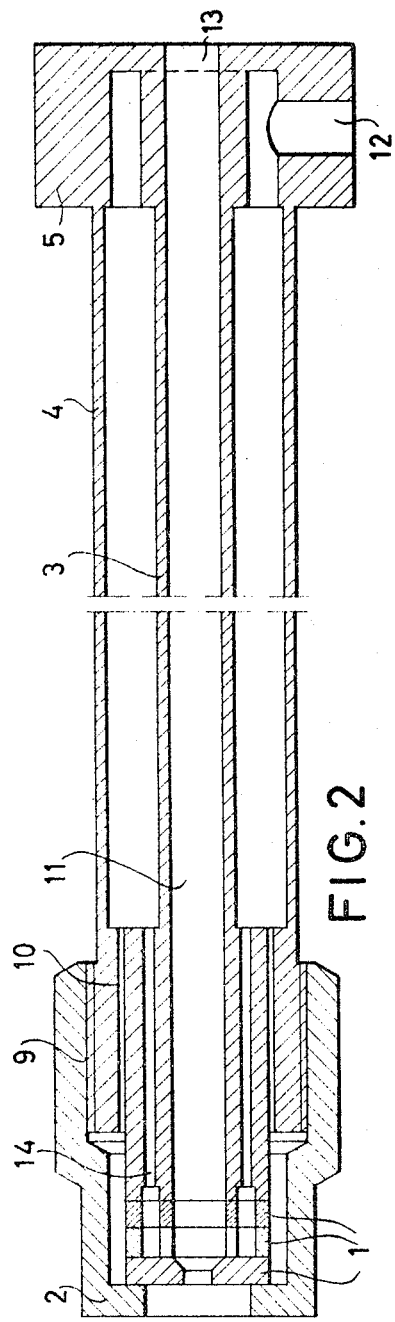
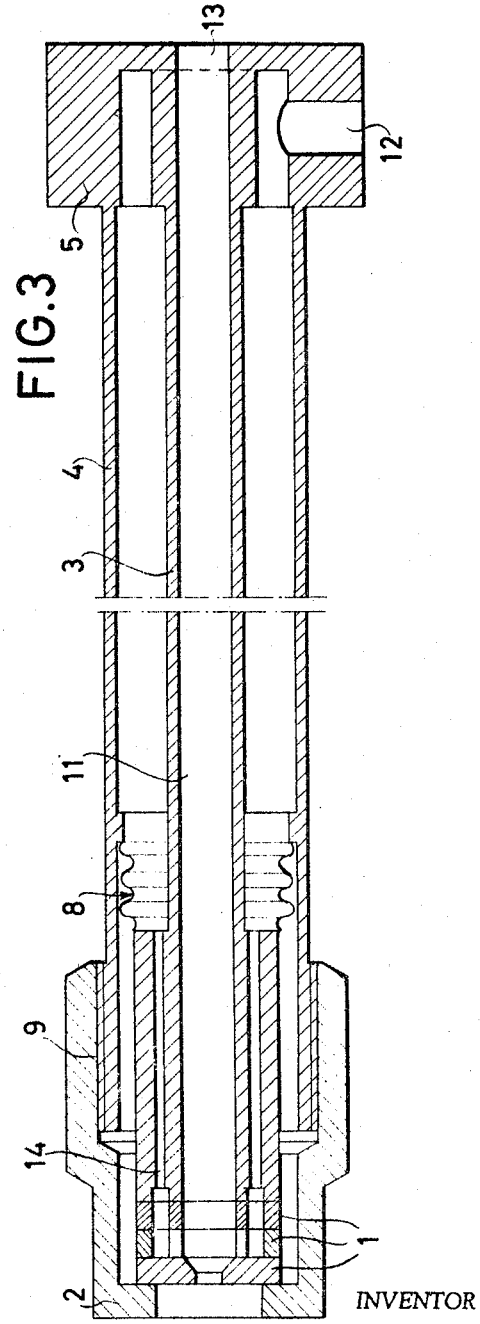

United States Patent Office 3,464,630
Patented Sept. 2, 1969

3,464,630
PRESSURE ATOMIZING OIL BURNER
Knud Erik Bendixen, Horsholm, Denmark, assignor to Aktieselskabet Burmeister & Wain's Maskin-og Skibsbyggeri, Copenhagen, Denmark, a company of Denmark
Filed Feb. 5, 1968, Ser. No. 702,907
Claims priority, application Denmark, Feb. 9, 1967, 712/67
Int. Cl. B05b 15/06
U.S. Cl. 239—124    3 Claims

ABSTRACT OF THE DISCLOSURE

An oil burner lance comprising a pair of co-axial pipes with a built-up atomizer on each free end clamped against the end of the inner pipe by means of a union nut screwed on to the outer pipe, the said co-axial pipes being without fixed mutual connection for such a distance reckoned from the atomizer towards the root of the burner lance that the elastic elongation and compression of the outer and inner pipe, respectively, when tensioned by the union nut together exceed—preferably several times—the elongation of the union nut itself due to radiant heat from the combustion chamber.

---

Figure 1:
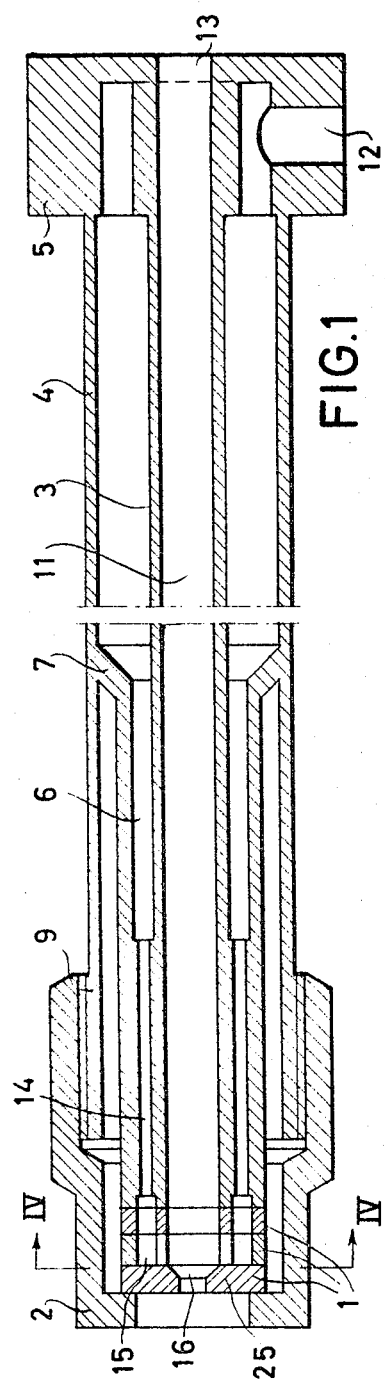

The present invention relates to an oil burner of the type in which the oil is atomized by a pure pressure atomization, preferably with the aid of a vortex chamber.

More particularly defined, the invention relates to a pressure atomizing oil burner of the type in which an atomizer is held clamped against the end face of a central oil supply pipe by means of an uncooled union nut screwed on an outer pipe which encloses the central pipe and forms a burner lance with the atomizer on its end adjacent the combustion chamber.

Such atomizing oil burners sometimes display and unreliable and fluctuating atomization performance and an output different from what might be expected. The invention is based on the recognition that these unfortunate phenomena are due to internal leakages in the atomizer caused by the fact that due to radiated heat from the combustion chamber the union nut assumes a substantially higher temperature than the remaining parts of the burner so that its heat expansion eliminates or considerably reduces the force with which the components of the atomizer are held clamped together and clamped against their seating faces in the burner lance. On the basis of this recognition the novelty of the invention consists in that in an atomizing oil burner of the type referred to the screw thread for the union nut is provided on the outer pipe, and that this pipe is in solid connection with the central pipe support only at so great a distance from the said screw thread that the elastic deformations of the intervening parts of the outer pipe and the central pipe are so much greater than the axial heat expansion of the union nut that a sufficient clamping pressure is preserved also at the highest operational temperatures occurring. Without the employment of detrimentally high clamping pressures, any reduction of the clamping forces is thus prevented, which reduction might lead to a detrimental internal leakage between the components of the atomizer and their seating faces.

The central pipe and the outer pipe may according to the invention at their ends remote from the atomizer be secured to a common base member and be sealed relatively movable in the vicinity of the atomizer, by which means it is possible in a simple way to provide ample lengths of the parts of the outer pipe and the central pipe subjected to tensile and compressive forces, respectively, for realizing the invention with a comparatively small variation in the absolute value of the clamping force under varying operational conditions.

The said seal may then according to the invention comprise an axial compensator in the form of a diaphragm or bellows by which means is achieved that liquid-sealing slide fits or stuffing boxes between the parts are avoided.

The invention is illustrated in the drawing in which

Figure 4:
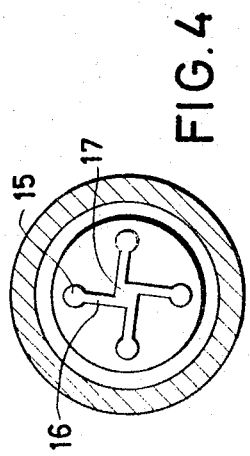

FIG. 1 partly diagrammatically shows a longitudinal section through a burner lance with an atomizing oil burner according to the invention, FIG. 2 correspondingly another embodiment, FIG. 3 correspondingly a third embodiment, and FIG. 4 a cross section on the line IV—IV of FIG. 1.

The atomizing oil burners shown in the drawing are all of the type operating with a vortex chamber, to which the oil is supplied under a substantially constant pressure at a substantially constant rate from an oil pump, not shown, and from which an adjustable part of the oil returns through a return pipe with an adjustable valve, while the remaining part emerges through a nozzle opening atomized in the form of a conical surface and is burned in a combustion chamber. In all of the three embodiments the lance consists of a pair of co-axial pipes 3 and 4 secured to a common base member 5 with an inlet opening 12 for the pressurized oil and an outlet opening 13 for the return oil flowing back. The atomizer consists of three plate-shaped components which as a whole are designated by 1 and which are held clamped against each other and against the left end face of the central pipe 3 by means of a union nut 2 which with a screw thread 9 is screwed on the free end of the outer tube 4.

The illustrated burners operate in the usual way, the pressurized oil being supplied through the opening 12, the clearance between the pipes 3 and 4, and a number of axial bores 14 in the left end of the inner pipe 3 which has a somewhat increased wall thickness, to an annular groove provided in the end face of the said inner pipe. From here, the oil is forced through a number of holes in the first plate-shaped atomizer component into aligned holes in the intermediate atomizer component, the vortex chamber plate, which is shown separately in FIG. 4 from which it appears that the oil flows from the supply holes 15 through tangentially directed channels 16 to a central vortex chamber 17, from which an adjustable part returns trough a return pipe 11 formed by the inner pipe 3, while the rest flows through a nozzle opening 16 in the outermost atomizer component 25, the nozzle plate, into the combustion chamber, not shown, in the form of a cone of finely atomized oil. The sealing between the individual components and against the end face of the inner pipe 3 is provided by these parts being ground plane and held clamped together under a suitably high pressure by means of the union nut 2. It will be appreciated that the capacity and reliable operation of the atomizer are dependent on absolute tightness between the faces clamped against each other. To ensure this although the union nut 2 during the operation asumes a considerably higher temperature than the remaining parts of the burner, the inner and the outer pipes are without any connection with each other for a comparatively long distance from the free end of the burner lance towards the common base member 5.

In the embodiment shown in FIG. 1 the pipes 3 and 4 are made in one integral piece and are held together by a transverse wall 7 at the rear end of the outer wall of an annular chamber 6 forming the transition to the axial bores 14. The clamping force exerted by the tightening of the union nut 2 consequently causes the whole of the outer end of the outer pipe 4 down to the transverse wall 7 to be subjected to a tensile force, while the outer end of the inner pipe 3 and the wall around the annular chamber 6 are subjected to a compressive force. By the tightening of the union nut 2 there will consequently occur a relative displacement between the threaded portion 9 and the end face of the inner pipe 3, and this relative displacement may by a suitable choice of the distance to the transverse wall 7 easily be made so much larger— e.g. ten times larger—than the possible axial heat expansion of the length of the union nut from the threaded portion 9 out to the free end that even the greatest conceivable heat expansion of this length cannot substantially reduce the tightening force.

In the embodiment shown in FIG. 2 the co-axial pipes 3 and 4 are only interconnected through the base member 5 proper, and at their front ends there is a cylindrical slide fit 10 creating the necessary seal against the supply pressure of the oil which acts in the space between the pipes 3 and 4. In this embodiment, the elasticity of the full length of the pipes 3 and 4 is utilized, so that the clamping pressure of the union nut remains practically constant irrespective of the value of the difference in temperatures between the union nut and the remaining parts.

In the embodiment shown in FIG. 3 the arrangement is substantially the same as in the embodiment in FIG. 2 with the difference that the slide fit 10 between the inner and the outer pipes has been omitted and has been replaced by an axial compensator in the form of a bellows 8, the ends of which in a suitable manner not further shown are secured to the inner and the outer pipe, respectively, so that an absolute tightness is preserved irrespective of relative axial and radial movements of the two pipe ends. Instead of the illustrated bellows 8 a diaphragm may be used secured with its inner edge to the inner pipe and with its outer edge to the outer pipe.

Problems corresponding to those explained above with regard to preserving the internal tightness of the atomizer will also be encountered in atomizing oil burners of a similar construction, but arranged for pure pressure atomizing by the oil being ejected through fine nozzle bores. Also in such burners the atomizer proper may be clamped against the end of a support member and possibly in itself comprise components clamped together in a way similar to that described above.

What is claimed is:
1. A pressure atomizing oil burner of the type in which an atomizer is held clamped against the end face of a central oil supply pipe by means of an uncooled union nut screwed on an outer pipe enclosing the said central pipe, characterized in that the screw thread for the said union nut is provided on the said outer pipe, and in that the said outer pipe is in solid connection with the said central pipe only at so great a distance from the said screw thread that the elastic deformations of the intervening portions of the outer pipe and the central pipe are so much larger than the axial heat expansion of the union nut that a sufficient clamping pressure is preserved also at the highest operational temperatures occurring.

2. A pressure atomizing oil burner as claimed in claim 1, characterized in that said central and outer pipes are secured to a common base member at their ends remote from the atomizer and are sealed relatively movable in the vicinity of the atomizer.

3. A pressure atomizing oil burner as claimed in claim 2, characterized in that the said seal comprises an axial compensator in the form of a diaphragm or bellows.

References Cited
UNITED STATES PATENTS

| | | | |
|---|---|---|---|
| 2,044,720 | 6/1936 | Fletcher | 239—600 X |
| 2,323,001 | 6/1943 | Bargeboer | 239—596 X |
| 2,374,041 | 4/1945 | Saha | 239—124 X |
| 2,637,375 | 5/1953 | Tapp et al. | 239—124 X |
| 3,144,075 | 8/1964 | Jackson | 239—126 |

SAMUEL F. COLEMAN, Primary Examiner

U.S. Cl. X.R.

239—497, 596, 600